(12) United States Patent
Coutu et al.

(10) Patent No.: US 11,859,554 B2
(45) Date of Patent: Jan. 2, 2024

(54) FAST ENGINE RE-START FOR MULTI-ENGINE SYSTEM AND METHOD

(71) Applicant: PRATT & WHITNEY CANADA CORP., Longueuil (CA)

(72) Inventors: Daniel Coutu, Longueuil (CA); Philippe Beauchesne-Martel, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 27 days.

(21) Appl. No.: 17/388,308

(22) Filed: Jul. 29, 2021

(65) Prior Publication Data

US 2023/0036374 A1 Feb. 2, 2023

(51) Int. Cl.
*F02C 9/18* (2006.01)
*F02C 7/26* (2006.01)
*B64D 31/00* (2006.01)
*F02C 6/20* (2006.01)

(52) U.S. Cl.
CPC .............. *F02C 7/26* (2013.01); *B64D 31/00* (2013.01); *F02C 6/20* (2013.01); *F02C 9/18* (2013.01); *F05D 2220/323* (2013.01); *F05D 2220/74* (2013.01); *F05D 2240/35* (2013.01); *F05D 2260/85* (2013.01)

(58) Field of Classification Search
CPC ...... F02C 9/18; F02C 6/08; F02C 6/00; F02C 6/02; F02C 7/26; F02C 7/27
See application file for complete search history.

(56) References Cited

U.S. PATENT DOCUMENTS

| 3,868,828 | A | * | 3/1975 | Schwartz | A23B 4/066 62/306 |
| 5,553,449 | A | * | 9/1996 | Rodgers | F02C 7/12 60/39.83 |
| 8,245,493 | B2 | * | 8/2012 | Minto | F02C 7/22 60/39.52 |
| 9,243,804 | B2 | * | 1/2016 | Zhang | F02C 3/30 |

(Continued)

FOREIGN PATENT DOCUMENTS

| EP | 3557025 | 10/2019 |
| EP | 3744636 | 12/2020 |
| FR | 3050815 | 11/2017 |

OTHER PUBLICATIONS

European Search report dated Jan. 9, 2023 for corresponding application No. 22186781.5.

*Primary Examiner* — Thuyhang N Nguyen
(74) *Attorney, Agent, or Firm* — NORTON ROSE FULBRIGHT CANADA LLP (57) ABSTRACT

A method of operating a multi-engine system of an aircraft having first and second engines includes accumulating compressed air in a pressure vessel external to the engines, and operating the first and second engines asymmetrically, by controlling the first engine to operate in an active operating condition providing sufficient power and/or rotor speed for demands of the aircraft, and controlling the second engine to operate in a standby operating condition wherein the second engine produces less power output than the first engine. In response to a power demand request, the second engine is accelerated out of the standby operating condition by introducing therein compressed air from the pressure vessel at a location upstream of a combustor of the second engine.

17 Claims, 6 Drawing Sheets

(56) References Cited

U.S. PATENT DOCUMENTS

| | | | |
|---|---|---|---|
| 9,915,201 B2* | 3/2018 | Karam | F02C 3/13 |
| 9,920,695 B2* | 3/2018 | Endres | F02K 1/32 |
| 10,927,757 B2 | 2/2021 | Stevenson | |
| 10,968,825 B2 | 4/2021 | Mackin | |
| 11,454,198 B2* | 9/2022 | Zhang | F02M 26/09 |
| 2010/0326085 A1* | 12/2010 | Veilleux | F01D 1/06 |
| | | | 60/778 |
| 2014/0366547 A1* | 12/2014 | Kraft | F01K 23/02 |
| | | | 60/793 |
| 2016/0273393 A1* | 9/2016 | Ekanayake | F02C 6/08 |
| 2016/0368614 A1 | 12/2016 | Endres | |
| 2018/0073437 A1* | 3/2018 | Simonetti | F02C 7/26 |
| 2018/0354632 A1* | 12/2018 | Hon | B64D 27/10 |
| 2019/0323426 A1 | 10/2019 | Mackin | |
| 2020/0047876 A1* | 2/2020 | Morgan | F01D 13/003 |
| 2020/0102894 A1 | 4/2020 | Duge et al. | |
| 2020/0191109 A1* | 6/2020 | Hector, Jr. | H02K 7/1823 |

* cited by examiner

FAST ENGINE RE-START FOR MULTI-ENGINE SYSTEM AND METHOD

TECHNICAL FIELD

The application relates to multi-engine systems for aircraft and methods of controlling such systems, engines and/or aircrafts.

BACKGROUND

Multi-engine helicopters are often provided with two or more engines, typically gas turbine turboshaft engines, connected to a main rotor via a common gearbox. Each of the engines is sized to provide power greater than what is required for cruising using both/all engines. During normal cruise operating regimes, both engines typically operate at similar power output levels (e.g. each engine provides 50% of the total power output provided to the aircraft).

Attempts have been made to operate the engines asymmetrically, that is, operating one engine at a higher power than the other. Doing so may provide improved better fuel efficiency overall. However, the engine operating at lower power needs to be able to rapidly speed back up when called upon, for example in the event of an emergency or if there is an urgent need for increased power. While existing systems may be suitable for their intended purposes, improvements remain desirable.

SUMMARY

In one aspect, there is provided a method of operating a multi-engine system of an aircraft having a first engine and a second engine, the method comprising: accumulating compressed air in a pressure vessel external to the first and second engines; operating the first and second engines asymmetrically, by controlling the first engine to operate in an active operating condition providing sufficient power and/or rotor speed for demands of the aircraft, and controlling the second engine to operate in a standby operating condition wherein the second engine produces less power output than the first engine; and in response to a power demand request, accelerating the second engine by introducing the compressed air from the pressure vessel into the second engine at a location upstream of a combustor of the second engine.

The method as described above and herein may further include, in whole or in part, one or more of the following additional steps/elements.

In certain embodiments, the method includes accumulating includes extracting bleed air from one or more of the first engine and the second engine, and feeding the bleed air into the pressure vessel.

In certain embodiments, the method includes extracting the bleed air includes extracting the bleed air from one or more of a high pressure compressor of the first engine and a high pressure compressor of the second engine.

In certain embodiments, the method includes extracting includes extracting the bleed air from the second engine prior to the second engine being controlled to produce less power output than the first engine.

In certain embodiments, the method includes accumulating includes gradually extracting the bleed air from both the one or more of the first and second engines from a beginning of a flight mission, after the one or more of the first and second engines is started or after the aircraft has taken-off.

In certain embodiments, the method includes accumulating includes using one or more valves to control the extracting of the bleed air.

In certain embodiments, the method includes accumulating includes extracting additional bleed air from the first engine after the second engine has been controlled to produce less power output than the first engine.

In certain embodiments, the method includes introducing the compressed air from the pressure vessel includes injecting the compressed air into the second engine upstream of a high pressure compressor of the second engine, to rapidly spin a high pressure spool of the second engine having the high pressure compressor.

In certain embodiments, both extracting bleed air to accumulate the compressed air in the pressure vessel and introducing the compressed air into the second engine is carried out via one or more common ports in the second engine.

In certain embodiments, the method includes controlling the second engine to operate in the standby operating condition includes operating the second engine to provide minimal or no propulsive power to the aircraft.

In certain embodiments, second engine is shut down in the standby operating condition, and the accelerating the second engine includes accelerating the second engine from shut down to an active operating condition corresponding to that of the first engine.

In certain embodiments, operating the second engine in the standby operating condition comprises, in flight, operating the second engine to produce substantially no motive power to the aircraft.

In certain embodiments, the method includes, prior to the introducing of the compressed air from the pressure vessel into the second engine at said location upstream of the combustor, the method includes blocking a main gas path of the second engine upstream of said location to prevent back-flow of the compressed air through the main gas path.

In another aspect, there is provided a multi-engine system for an aircraft comprising: a first engine and a second engine driving a common gearbox configured to drive a load, the first engine and the second engine respectively including a first compressor and a second compressor; a pressure vessel external to the first engine and the second engine, the pressure vessel in fluid flow communication with one or both of the first and second compressors via: an accumulation flow path along which compressed air produced by one or both of the first and second compressors flows to reach the pressure vessel; and an injection flow path along which compressed air accumulated within the pressure vessel flows to reach an injection port in at least the second engine; and a valve in fluid communication with the accumulation flow path and the injection flow path, the valve being operable to move between a closed position and an open position, wherein in the open position the compressed air is permitted to flow either along the accumulation flow path or along the injection flow path.

The multi-engine system as described above and herein may further include, in whole or in part, one or more of the following additional elements.

In certain embodiments, the system includes an engine controller configured to control the first engine to operate in an active operating condition and to control the second engine to operate in a standby operating condition, wherein in the active operating condition the first engine provides sufficient power and/or rotor speed for demands for the aircraft, and in the standby operating condition the second engine provides provide minimal or no propulsive power to the aircraft.

In certain embodiments, the engine controller is in communication with the valve to control operation thereof, the engine controller operable to position the valve at one or more intermediate positions between the closed position and the open position, to control injection and extraction of compressed air through the accumulation flow path and the injection flow path.

In certain embodiments, the pressure vessel is one of two or more pressure vessels, each of the two or more pressure vessels being in fluid flow communication with a respective one of the first and second engines.

In certain embodiments, the pressure vessel is inflatable.

In certain embodiments, the pressure vessel is thermally insulated, to retain heat of the compressed air accumulated within the pressure vessel.

In certain embodiments, the pressure vessel is cooled to increase a storage capacity thereof.

BRIEF DESCRIPTION OF THE DRAWINGS

Reference is now made to the accompanying figures in which.

DETAILED DESCRIPTION

To maintain clarity of this description, some of the same reference numerals have been used in different embodiments to show features that may be common to the different embodiments.

Figure 1:
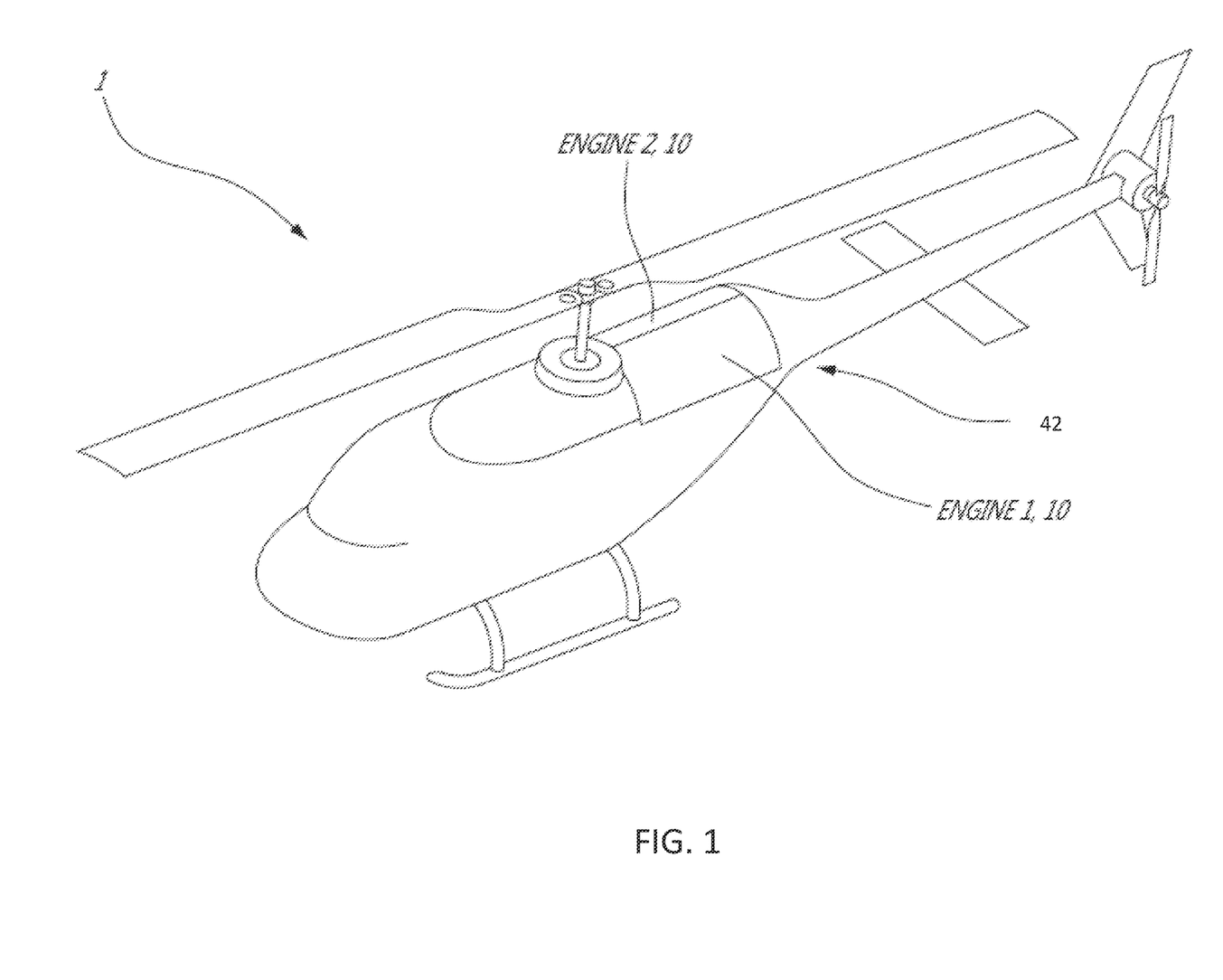
FIG. 1 is a schematic view of a multi-engine aircraft.

FIG. 1 depicts an exemplary multi-engine aircraft 1, which in this case is a helicopter. The aircraft 1 may however also be a fixed-wing aircraft. The aircraft 1 includes at least two aircraft engines 10 (or simply "engines"), labeled in FIG. 1 as "ENGINE 1" and "ENGINE 2". In a particular embodiment, these two engines are turboshaft gas turbine engines. However, it is to be understood that one or both of the engines may also and/or alternately be hybrid or other types suitable aircraft engines, and may therefore be at least partially electrically driven. The two engines 10 may be interconnected by a common gearbox 46 (see FIG. 2), forming a multi-engine system 42 as shown in FIG. 2 and as will be described in further detail below.

Figure 2:
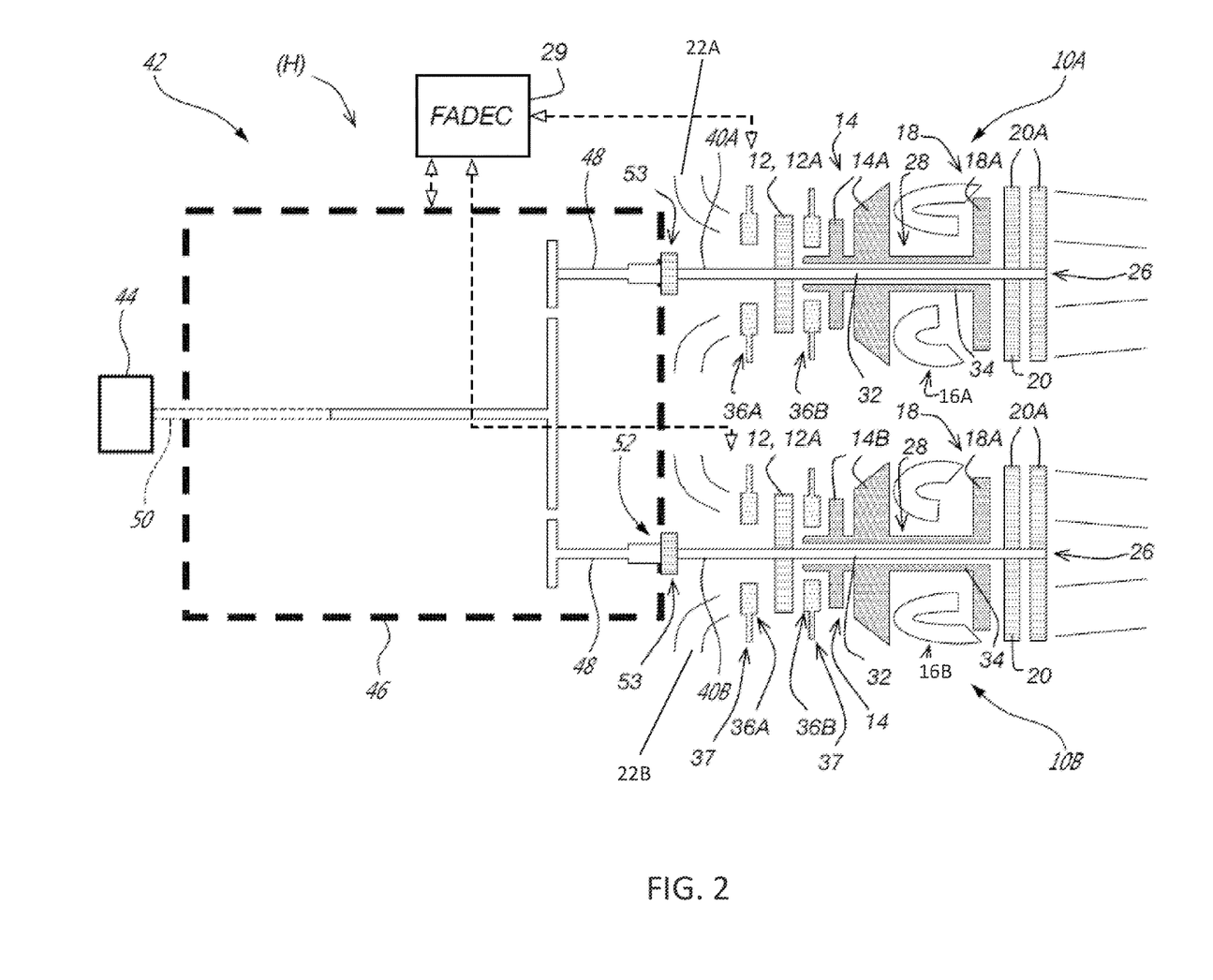
FIG. 2 is a schematic representation of a multi-engine system for the aircraft of FIG. 1, showing schematic axial cross-sectional views of two engines powering the aircraft via a common output gearbox.

FIG. 2 illustrates an exemplary multi-engine system 42 to be used as a power plant for the aircraft 1, which can include but is not limited to a rotorcraft such as the helicopter (H) of FIG. 1. The multi-engine system 42 may include multiple engines 10, and in one embodiment includes two or more engines 10A, 10B. In the case of a helicopter application, these engines 10A, 10B may be turboshaft gas turbine engines. They may alternatively be other types of gas turbine engines, or any suitable aircraft engines such as hybrid and/or electrically powered engines. Control of the multi-engine system 42 is effected by one or more controller(s) 29, which may be FADEC(s), electronic engine controller(s) (EEC(s)), or the like, that are programmed to manage, as described herein below, the operation of the engines 10A, 10B to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 42. Other phases of a typical helicopter mission would include transient phases like take-off, climb, stationary flight (hovering), approach and landing. Cruise may occur at higher altitudes and higher speeds, or at lower altitudes and speeds, such as during a search phase of a search-and-rescue mission.

When the aircraft conditions, such as cruise speed and altitude, are substantially stable—such as during a cruise flight segment of the aircraft—the engines 10A, 10B of the system 42 may be operated asymmetrically, with one engine operated in a high-power "active" mode and the other engine operated in a lower-power "standby" mode. Doing so may provide fuel saving opportunities to the aircraft, however there may be other suitable reasons why the engines are desired to be operated asymmetrically. This operation management may therefore be alternately referred to herein as an "asymmetric mode", an "asymmetric operating regime" or an "idle cruise regime" (ICR), wherein one of the two engines is operated in a low-power "standby mode" while the other engine is operated in a high-power "active" mode. In such an asymmetric operation, which may be engaged during a cruise phase of flight (continuous, steady-state flight which is typically at a given commanded constant aircraft cruising speed and altitude). This operation management may therefore be referred to as a "asymmetric operation mode", or an "idle cruise regime" (ICR), wherein one of the two engines is operated in a low-power or "standby mode" (also referred to herein as a "standby operating condition") while the other engine is operated in a high-power or "active mode". In the standby mode, an engine provides significantly less propulsive power to the aircraft than does the other engine operating in the higher-power, active mode. In certain embodiments, the engine operating in the standby mode may even provide no or almost no propulsive power to the aircraft.

The multi-engine system 42 may be used in an aircraft, such as but not limited to a helicopter, but also has applications in suitable marine and/or industrial applications or other ground operations.

As shown in FIG. 2, the multi-engine system 42 may include a first engine 10A and a second engine 10B configured to drive a common load 44. In the depicted embodiment, the engines 10A, 10B are turboshaft gas turbine engines. In some embodiments, the common load 44 may comprise a rotary wing of a rotary-wing aircraft. For example, the common load 44 may be a main rotor of the helicopter. Depending on the type of the common load 44 and on the operating speed thereof, turboshaft engines 10A, 10B may be drivingly coupled to the common load 44 via a gearbox 46, which may be any suitable type, such as a speed-changing (e.g., reducing) type. The gearbox 46 may have a plurality of transmission shafts 48 to receive mechanical energy from respective output shafts 40A, 40B of respective turboshaft engines 10A, 10B to direct at least some of the combined mechanical energy from the plurality of the turboshaft engines 10A, 10B to a common output shaft 50 for driving the common load 44 at a suitable operating (e.g., rotational) speed. The multi-engine system 42 may include a transmission 52 driven by the output shaft 40B and driving the rotatable transmission shaft 48. The transmission 52 may be controlled to vary a ratio between the rotational speeds of the respective output shaft 40A/40B and transmission shaft 48.

The multi-engine system 42 may be configured, for example, to drive accessories of an associated aircraft in addition to the main rotor. The gearbox 46 may be configured to permit the common load 44 to be driven by either the first turboshaft engine 10A or the second turboshaft engine 10B, or, by a combination of both the first turboshaft engine 10A and the second turboshaft engine together 10B. A clutch 53 may be provided to permit each engine 10A, 10B to be engaged and disengaged with the transmission X, as desired. For example, an engine 10A, 10B running at low- or no-power conditions may be declutched from the transmission if desired. In some embodiments, a conventional clutch may be used.

Referring still to FIG. 2, according to the present description the multi-engine system 42 driving a helicopter (H) or other aircraft 1 may be operated in such an asymmetric manner, in which a first one of the engines (say, 10A) is operated at high power in an active mode and the second one of the engines, for instance the engine 10B in this example, is capable of being operated in a low-power standby mode. In one example, the first engine 10A may be controlled by the controller(s) 29 to run at full (or near-full) power conditions in the active mode, to supply substantially all or all of a required power and/or speed demand of the common load 44 and thus the aircraft. The second engine 10B may be controlled by the controller(s) 29 to operate at low-power or no-output-power conditions to supply one of substantially little, substantially none or none of a required power and/or speed demand of the common load 44. Optionally, a clutch may be provided to declutch the low-power engine. Controller(s) 29 may control the engine's governing on power according to an appropriate schedule or control regime. The controller(s) 29 may comprise a first controller for controlling the first engine 10A and a second controller for controlling the second engine 10B. The first controller and the second controller may be in communication with each other in order to implement the operations described herein. In some embodiments, a single controller 29 may be used for controlling the first engine 10A and the second engine 10B. The term controller as used herein includes any one of: a single controller controlling the engines, and any suitable combination of multiple controllers controlling the engines, including one or more controllers for each engine, so long as the functionality described in this document is provided. In another example, an asymmetric operating regime of the engines may be achieved through the one or more controller's 29 differential control of fuel flow to the engines, as described in pending application Ser. No. 16/535,256 filed Aug. 8, 2019, the entire contents of which are incorporated herein by reference. Low fuel flow may also include zero fuel flow in some examples.

Although various differential control between the engines of the engine system 42 are possible, in one particular embodiment the controller(s) 29 may correspondingly control fuel flow rate to each engine 10A, 10B accordingly. In the case of the standby engine, a fuel flow (and/or a fuel flow rate) provided to the standby engine may in certain embodiments be controlled to be between 70% and 99.5% less than the fuel flow (and/or the fuel flow rate) provided to the active engine. In the asymmetric mode, the standby engine may be maintained between 70% and 99.5% less than the fuel flow to the active engine. In some embodiments, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine. In other possible embodiments, the standby engine may be completely shut down, such that no fuel flow is used by this engine when it is operating in the standby mode. In such a case, therefore, the fuel flow (which is zero) to the standby engine is thus 100% less than the fuel flow to the active engine. It is therefore to be understood that the term "standby" mode as used herein is intended to include, in certain embodiments, a complete shut-down state of the standby engine, whereby only one of the two engines (i.e. the active engine) is in operation. A complete shut down of the second engine placed into the standby mode may be particularly interesting given that it completely eliminates fuel consumption by that engine, thereby reducing fuel consumption and thus fuel costs, while also reducing the total flight hours of the engine, thereby reducing related maintenance and operating costs.

In another embodiment, the controller 29 may operate one engine of the multiengine system 42, for instance the engine 10B, in a standby mode at a power substantially lower than a rated cruise power level of the engine, and in some embodiments at zero output power and in other embodiments less than 10% output power relative to a reference power (provided at a reference fuel flow). Alternately still, in some embodiments, the controller(s) 29 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the multi-engine system 42 of FIG. 2 may be operated in an asymmetric operating regime by control of the relative speed of the engines using controller(s) 29, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the asymmetric operating regime, such as control based on a target pressure ratio, or other suitable control parameters.

In use, the first turboshaft engine (say 10A) may operate in the active mode while the second turboshaft engine, such as the engine 10B, may operate in the standby mode, as described above. Although the examples described herein illustrate two engines, asymmetric mode is applicable to more than two engines, whereby at least one of the multiple engines is operated in a low-power standby mode while the remaining engines are operated in the active mode to supply all or substantially all of a required power and/or speed demand of a common load.

During such asymmetric operation, if the helicopter (H) needs a power increase (expected or otherwise), the second turboshaft engine 10B may be required to provide more power relative to the low power conditions of the standby mode, and possibly rapidly to a high-power or full-power condition. In such situations, the engine 10B operating previously in a low power condition must be able to quickly accelerate back up to cruise or full power output levels. This may be required, for example, in the event of an emergency or an urgent need for increased power (e.g. if the pilot requires additional power in order to perform a desired manoeuver). In certain conditions/applications, it may also be possible to completely shut down the second engine 10B engine. However, to do so would require the ability to rapidly re-start the second engine in the event of an emergency or sudden need for more power. Even absent an emergency, it will be desirable to repower the standby engine to exit the asymmetric mode, such that the two engines operate in a normal cruise operating regime whereby both engines operate at similar power output levels (e.g. each engine provides about 50% of the total power output provided to the aircraft).

As will be described in further detail below with reference to FIGS. 4 and 5, the multi-engine system 42 of the present disclosure includes an air accumulation system 70 which is operable to assist an engine operating in a low power condition to quickly accelerate back up to cruise or full power output levels. As will be seen, this is accomplished by introducing external compressed air from outside the engines 10A, 10B into the engine to be accelerated, in order to assist its rapid acceleration back up to cruise or full power. More particularly, compressed air is extracted (e.g. bled off) form one or both engines 10A, 10B of the multi-engine system 42 and accumulated in a tank or pressure vessel 80 that is external to both engines 10A, 10B. When rapid re-acceleration of an engine operating in a stand-by mode becomes required, for example in response to a power demand, then the compressed air that has been accumulated in the external pressure vessel 80 is introduced (or re-introduced, as the case may be) into the cold section of the engine in order to permit it to more rapidly accelerate to a higher power output. The cold section of the engine is understood to be located upstream of a combustor 16 of the engine, and more particularly is defined as extending from an air inlet of the engine 22 to, but not including, a combustion zone located within the combustion chamber liner of the combustor 16.

Before additional details of the air accumulation system 70 and its method of operation are described, each of the engines 10, 10A, 10B of the multi-engine system 42 will first be described in further detail, with reference to FIGS. 2 and 3.

Figure 3:
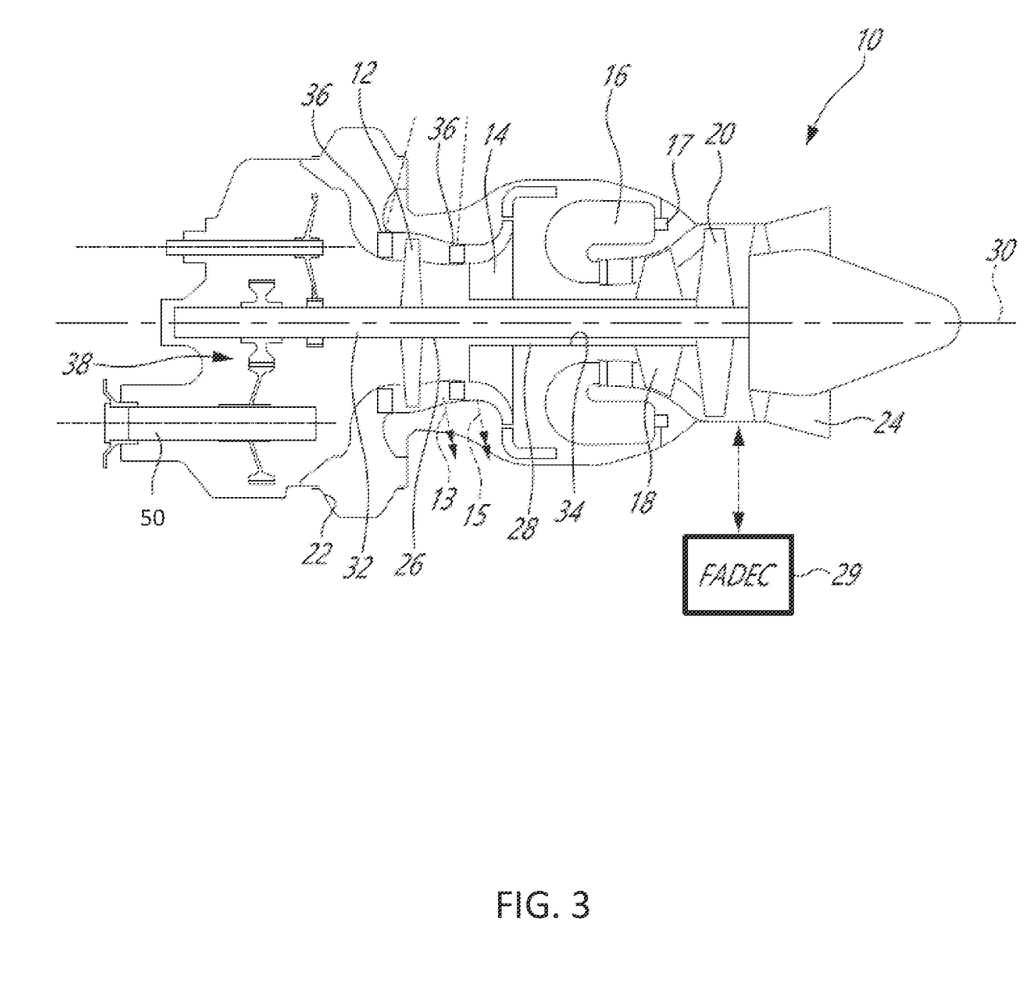
FIG. 3 is a schematic cross-sectional view of one of the engines of the multi-engine system of FIG. 2.

As shown in FIGS. 2 and 3, each aircraft engine 10A, 10B (identified simply as engine 10 in FIG. 3) of the multi-engine system 42 may, as in the depicted embodiment, be a turboshaft gas turbine engine generally comprising in serial flow communication a low pressure (LP) compressor section, which will be referred to herein as the LP compressor 12 and a high pressure (HP) compressor section, which will be referred below as the HP compressor 14 for pressurizing air received via an air inlet 22. The air compressed by the LP compressor 12 and by the HP compressor 14 is fed to a combustor 16 in which the compressed air is mixed with a fuel flow, delivered to the combustor 16 via fuel nozzles 17 from a suitable fuel system, and ignited for generating a stream of hot combustion gases. A high pressure turbine section, which will referred to herein as the HP turbine 18, extracts energy from the combustion gases. A low pressure turbine section, which will be referred to herein as the LP turbine 20 is located downstream of the HP turbine 18 for further extracting energy from the combustion gases and driving the LP compressor 12. The combustion gases are then exhausted by an exhaust outlet 24. The LP compressor 12 may include one or more compression stages, and the HP compressor 14 may include one or more compression stages.

In the embodiment shown, the turboshaft engine 10 includes a low-pressure spool, referred to below as LP spool 26, and a high-pressure spool, referred to below as a HP spool 28. The LP spool 26 includes a low-pressure shaft, referred to below as LP shaft 32. The HP spool 28 includes a high-pressure shaft, referred to below as HP shaft 34. The HP turbine 18 is drivingly engaged to the HP compressor 14 via the HP shaft 34. The LP turbine 20 is drivingly engaged to the LP compressor 12 via the LP shaft 32. The HP spool 28, and the components mounted thereon, are configured to rotate independently from the LP spool 26 and from the components mounted thereon. These two spools may thus rotate at different speeds about an engine central axis 30. The HP shaft 34 and the LP shaft 32 may be concentric. In the embodiment shown, the HP shaft 34 extends around the LP shaft 32. The term "spool" is herein intended to broadly refer to drivingly connected turbine and compressor rotors, and need not mean the simple shaft arrangements depicted.

Although the gas turbine engine 10 as shown in FIG. 3 is a multi-spool engine, having separate LP spool 26 and HP spool 28, it is to be understood that in an alternate embodiment, one or more of the engines 10A, 10B of the multi-engine system 42 may have a single spool architecture, which is often the case for auxiliary power unit (APU) engines used in aircraft.

In the embodiment shown, the HP compressor 14 rotates at the same speed as the HP turbine 18. And, the LP compressor 12 rotates at the same speed as the LP turbine 20. However, this may not be the case if transmission(s) are provided on the LP spool 26 and HP spool 28 to create speed ratios between the interconnected compressors and turbines. This may increase or decrease rotational speeds of the compressors relative to that of the turbines. Any suitable transmissions may be used for this purpose.

The turboshaft engine 10 may include a transmission 38 driven by the low pressure shaft 32 and driving a rotatable output shaft 40. The transmission 38 may be provided to vary a ratio between rotational speeds of the low pressure shaft 32 and the output shaft 40. The LP compressor 12 and the HP compressor 14 are configured to deliver desired respective pressure ratios in use, as will be described further below.

The LP compressor 12 of the engine 10 (and therefore of each of the engines 10A, 10B of FIGS. 2 and 4) may have a bleed valve 13 (shown schematically) configured to selectively bleed air from the LP compressor 12, via an associated bleed port, according to a desired control regime of the engine 10, for example to assist in control of compressor stability.

As mentioned, the HP compressor 14 is configured to independently rotate from the LP compressor 12 by virtue of their mounting on different engine spools. The HP compressor 14 may include one or more compression stages, such as a single stage, or two or more stages as shown in more detail in FIG. 2. It is contemplated that the HP compressor 14 may include any suitable type and/or configuration of stages. The HP compressor 14 is configured to deliver a desired pressure ratio in use, as will be described further below. The HP compressor 14 may have a bleed valve 15 (shown schematically) which may be configured to selectively bleed air from the HP compressor 14, via an associated bleed port, according to a desired control regime of the engine 10, for example to assist in control of compressor stability.

Figure 4:
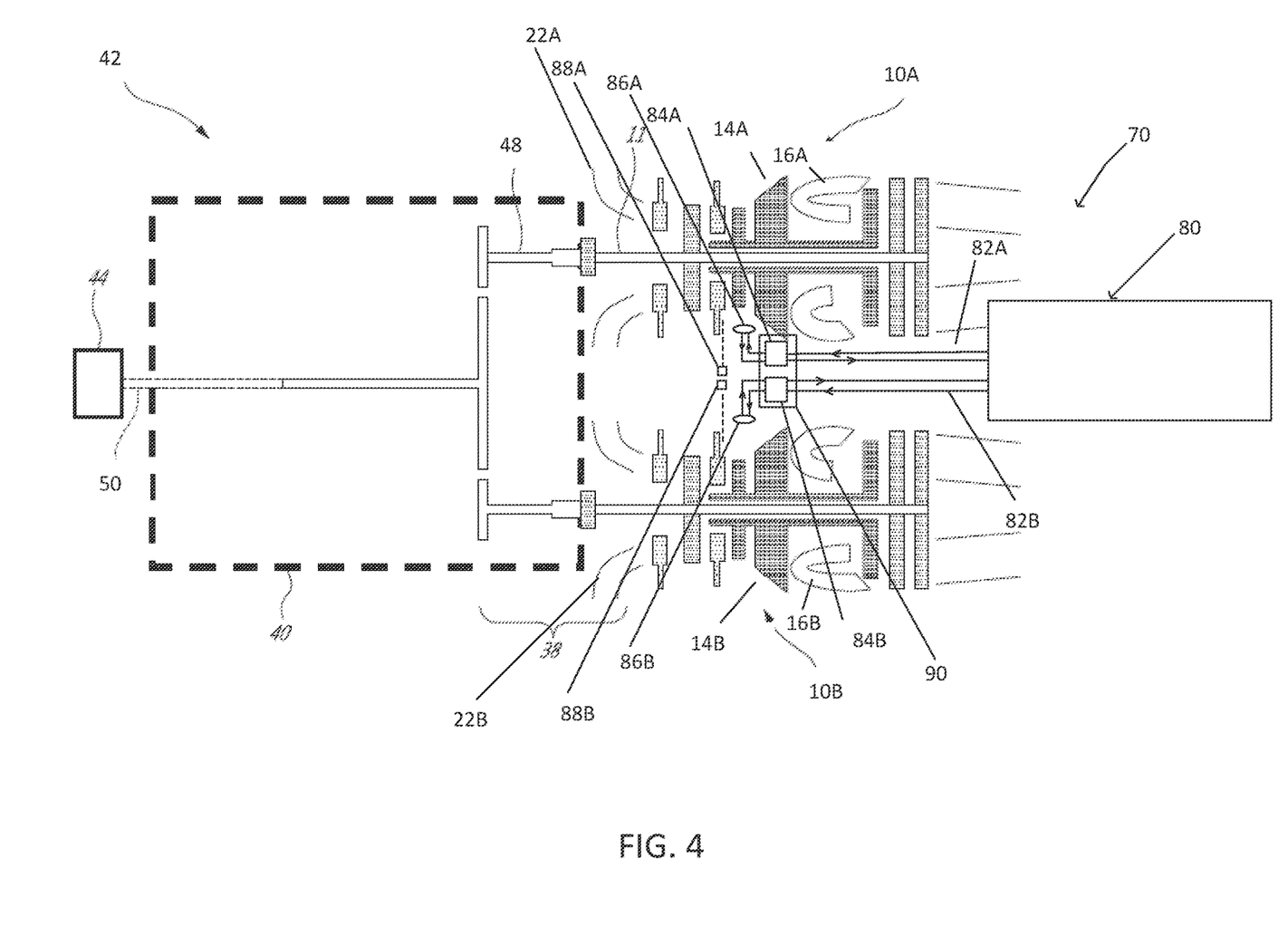
FIG. 4 is another schematic representation of the multi-engine system of FIG. 2, showing an air accumulation system thereof having an external pressure vessel.

One or both of the bleed valve 13 located within the LP compressor 12 and the HP compressor 14 may also serve as accumulator injection/bleed ports 86A, 86B, as shown in FIG. 4 and described further below as part of the air accumulation system 70. Alternately, the engine 10 (and thus the two engines 10A, 10B) may each include regular bleed valve 13 and/or 15, in addition to at least one accumulator injection/bleed ports 86A, 86B as described below. In one particular embodiment, the accumulator injection/bleed ports 86A, 86B may be located within the HP compressor 14, for example just upstream of the combustor (at an engine station often referred to as "P3", where the static pressure of the compressed air produced by the compressor(s) of the engine is the highest). Regardless of the chosen configuration, both the standard compressor bleed valves 13, 15 and the accumulator injection/bleed ports 86A, 86B are located within the "cold section" of the engine, that is upstream of the combustor 16 within the engine. Further details of the accumulator injection/bleed ports 86A, 86B will be provided below.

The expression "upstream of the combustor" as used herein, particularly with reference to the location at which compressed air from the pressure vessel 80 is introduced into the second engine, is therefore understood to mean anywhere within the cold section of the engine, between the air inlet 22 and the combustor 16 (and more precisely the combustion zone contained within the combustion chamber liner(s) of the combustor). This includes the air plenums, cavities or passages which may surround the combustor 16, even if some or all of such plenums, cavities or passages are axially located at or forward of the combustion chamber liner itself), at which location(s) the pressure of the compressed air (e.g. P3 air) is the highest.

In use, suitable one or more controllers 29, such as one or more full authority digital controllers (FADEC) providing full authority digital control of the various relevant parts of the engine 10, controls operation of the engine 10. The FADEC(s) may be provided as for example conventional software and/or hardware, so long as the FADEC(s) is/are configured to perform the various control methods and sequences as described in this document. Each controller 29 may be used to control one or more engines 10 of an aircraft (H). Additionally, in some embodiments the controller(s) 29 may be configured for controlling operation of other elements of the aircraft (H), for instance the main rotor 44.

Referring still to FIGS. 2 and 3, the turboshaft engine 10 may also include variable guide vanes (VGVs) 36, 36A, 36B. As seen in FIG. 2, a first set of VGVs 36A is located upstream of the LP compressor 12, and a second set of VGVs 36B is located upstream of the HP compressor 14. The VGVs 36 may be independently controlled by suitable one or more controllers 29, as described above. The VGVs 36 may direct inlet air to the corresponding stage of the LP compressor 12 and of the HP compressor 14. The VGVs 36 may be operated to modulate the inlet air flow to the compressors in a manner which may allow for improved control of the output power of the turboshaft engine 10, as described in more detail below. The VGVs 36 may be provided with any suitable operating range. In some embodiments, VGVs 36 may be configured to be positioned and/or modulated between about +80 degrees and about −25 degrees, with 0 degrees being defined as aligned with the inlet air flow. In a more specific embodiment, the VGVs 36 may rotate in a range from +78.5 degrees to −25 degrees, or from +75 degrees to −20 degrees, and more particularly still from 70 degrees to −20 degrees. The two set of VGVs 36 may be configured for a similar range of positions, or other suitable position range.

In some embodiments, the first set of VGVs 36A upstream of the LP compressor 12 may be mechanically decoupled from the second set of VGVs 36B upstream of the HP compressor 14 and downstream of the LP compressor 12, having no mechanical link between the two sets of VGVs to permit independent operation of the respective stages. The VGVs 36 may be operatively controlled by the controller(s) 29 described above, to be operated independently of each other. Indeed, the turboshaft engine 10 is also controlled using controller(s) 29 described above, to carry out the methods described in this document. For the purposes of this document, the term "independently" in respects of the VGVs 36 means that the position of one set of the VGV vanes (e.g. 36A) may be set without effecting any change to a position of the other set of the VGV vanes (e.g. 36B), and vice versa.

Independent control of the VGVs 36 may allow the spools 26, 28 to be operated to reduce or eliminate or reduce aerodynamic coupling between the spools 26, 28. This may permit the spools 26, 28 to be operated at a wider range of speeds than may otherwise be possible. The independent control of the VGVs 36 may allow the spools 26, 28 to be operated at constant speed over a wider operating range, such as from a "standby" speed to a "cruise" power speed, or a higher speed. In some embodiments, independent control of the VGVs 36 may allow the spools 26, 28 to run at speeds close to maximum power. In some embodiments, independent control of the VGVs 36 may also allow one of the spools 26, 28 to run at high speed while the other one run at low speed.

In use, the turboshaft engine 10 is operated by the controller(s) 29 described above to introduce a fuel flow via the nozzles 17 to the combustor 16. Combustion gases turn the HP turbine 18 and the LP turbine 20 which in turn drive the HP compressor 14 and the LP compressor 12. The controller(s) 29 control(s) the angular position of VGVs 36 in accordance with a desired control regime, as will be described further below. The speed of the engine 10 is controlled, at least in part, by the delivery of a desired fuel flow rate to the engine, with a lower fuel flow rate causing the turboshaft engine 10 to operate at a lower output speed than a higher fuel flow rate.

Referring now to FIG. 4, the multi-engine system 42 also includes an air accumulation system 70 which includes an air tank or pressure vessel 80, which is external to both the first and second engines 10A, 10B, an serves to receive and retain therein compressed air that is bled off from one or both of the engines 10A, 10B. As will be described in further detail, once the pressure vessel 80 is filled, either partially or fully, with compressed air, it is stored therein until such as time as it is needed for injection, or re-injection, into one of the two engines 10A, 10B that is operating in a standby mode as described above. Accordingly, in certain embodiments the standby engine can be completely shut down, once there is sufficient air pressure in the pressure vessel 80. The external pressure vessel 80 will have an internal volume that is sufficient to guarantee engine start when the compressed air stored in the pressure vessel is injected back into the standby engine when required for an emergency re-start and/or rapid acceleration.

The pressure vessel 80 is external to both engines 10A, 10B, and may be physically located either within the overall multi-engine system package or may alternately be located elsewhere within the aircraft. While it will be appreciated that the pressure vessel 80 must be suitable to hold compressed air having a pressure corresponding to the air pressures generated by the engines, the exact construction of the pressure vessel 80 may be selected to be suitable for the purposes described herein. In certain embodiments, the pressure vessel 80 may be inflatable, such that it remains lightweight and when it is empty (and thus is deflated) it will take up relatively little space within the aircraft. Additionally, in certain embodiments, the external pressure vessel 80 may also be thermally insulated, so as to help to retain the heat in the extracted air that was generated when it was compressed. Alternately still, the pressure vessel 80 may also be cooled, either passively or actively using a suitable heat-exchanger for example. This may be useful so as to increase the storage capacity, in terms of total mass of the compressed air accumulated therein at a given pressure, thereby allowing—when the accumulated air is injected back into the re-acerbating engine—more fuel flow into the combustion chamber before reaching the hot section temperature limit.

Thus, the pressure vessel 80 is fluidly connected to each of the first engine 10A and the second engine 10B by one or more air conduits 82A, 82B which define each one or more airflow paths between an internal cavity of the pressure vessel 80 and the cold section of a respective one of the engines 10A, 10B. More particularly, each of the air conduits 82A, 82B may provide a first, accumulation, flow path used to transport compressed air from the cold section of the respective engines 10A, 10B (i.e. from the compressor(s), upstream of the combustors) to the pressure vessel 80, and a second, injection, flow path used to transport compressed air from the pressure vessel 80 to the cold section of the respective engines 10A, 10B. It is to be understood, however, that a single conduit 82A, 82B can be used to direct air to and from each respective engine 10A, 10B, such that air flows out of the engines and into the engines through the same passage, line or conduit. Although the depicted embodiment shows only a single pressure vessel 80, it is to be understood that two or more pressure vessels may also be used. For example, each engine 10A, 10B may have its own dedicated pressure vessel 80, within which air is accumulated and stored for sub-sequent delivery to is respective engine.

Each of the first and second engines 10A, 10B includes a respective accumulator injection/bleed port 86A, 86B located within the cold section of the engine. These ports 86A, 86B may also be simply referred to herein as "bleed ports" even if they may also serve to inject compressed air flow into the engine in addition to or in stead of being used to bleed compressed air off from the engine for filling the pressure vessel 80.

In the depicted embodiment, the accumulator bleed ports 86A, 86B are located within the HP compressor 14A, 14B, just upstream of their respective combustors 16A, 16B. Thus, the air bled off via the accumulator bleed ports 86A, 86B, when one or more associated control valves 84A, 84B are opened, and subsequently stored in the pressure vessel 80, will have a high pressure. These control valves 84A, 84B may also be, or include, one-way valves such as to prevent flow of the compressed air in an unwanted direction.

The control valves 84A, 84B are thus operable to control the flow of air to and from the pressure vessel 80, and thus to control the injection of the pressurized air contained within the pressure vessel 80 into one of the engines, when it becomes desirable to do so in the manner described herein. In the depicted embodiment, a first control valve 84A is disposed in flow communication with the first air conduit 82A and a second control valve 84B is disposed in flow communication with the second air conduit 82B, wherein the first and second control valves 84A, 84B can be used to either allow or prevent flow between the cold sections of the engines 10A, 10B and the pressure vessel 80. In an alternate embodiment, a single, multi-port, valve may be able to be used in place of the two separate control valves 84A, 84B, provided that independent flow within each of the first and second air conduits 82A, 82B can be separately controlled.

As such, compressed air can be drawn or bled off from only one or both of the engines 10A, 10B via one or both of the accumulator bleed ports 86A, 86B located within the cold section of the engines, as controlled by the one or both control valves 84A, 84B prior to the shut-down (or reduction of power output) of one of the two engines into a low-power standby mode. The air extracted in this manner is accordingly directed through the respective one(s) of the first and second air conduits 82A, 82B (depending of course on which port is opened to allow bleed flow therethrough) to the pressure vessel 80, where the compressed air is accumulated, and retained future use.

This accumulated of the compressed air within the pressure vessel 80 may, in one particular embodiment, be done gradually, while the engine from which the air is extracted is operating at standard cruise or high power (e.g. a high pressure ratios).

For example, in one operation scenario, high pressure air is drawn off from the HP compressor 14B of the second engine 10B, via its accumulator bleed port 86B, right from the beginning of a normal flight mission, as the engine 10B starts, then idles, then gets to take-off power. Because the pressure at this location of the engine will increase over a sufficiently long time interval, and the volume of compressed air extracted via accumulator bleed port 86B and fed to the pressure vessel 80 remains relative small (i.e. relative to the total volume of air flowing through the HP compressor 14B) throughout, this small extraction of flow from the HP compressor 14B will not be "perceptible" to the overall engine operability—in other words, this relatively small amount of compressed air that is extracted for feeding to the pressure vessel 80 will have little to no impact on the overall performance and operability of the engine.

However, if the compressed air used to fill the pressure vessel 80 is extracted from either engine while the engine or engines are already operating in a high power regime (e.g. following an emergency re-start or acceleration for instance), then it may be desirable to bleed this air off slowly, again via the accumulator bleed ports 86A, 86B, such as to prevent compressor surge and limit performance penalties. For that purpose, a servo valve (controlled via the FADEC for instance) could be used. Such a servo valve may form part of the control valve or valves 84A, 84B, or may be an additional servo valve(s) in other instances.

Further, when the external pressure vessel 80 has been "charged" (i.e. filled, either partially or fully, with the accumulated compressed air), and the second engine 10B has been shut down or placed into a low power operating condition, it is also possible to use the first engine 10A (e.g. the active engine operating a regular cruise or full power) to add small amounts of additional compressed air into the external pressure vessel 80—e.g. either periodically or using a small but continuous trickle flow. In this manner, the compressed air within the pressure vessel 80 can be "topped up" using air extracted from the active engine. This may help to keep the pressure within the external pressure vessel 80 at a desired level and/or may be used to replenish any lost or used accumulated compressed air, which may be particularly useful if there is a cooling mechanism in place that could cause the pressure within the pressure vessel 80 to drop. In this manner, both the volume and pressure of the accumulated compressed air within the external pressure vessel can be maintained at desired levels, so as to ensure that if/when this accumulated air is needed it will be sufficient for injection into the standby engine for emergency start-up and/or rapid acceleration of the standby or shut-down engine.

In one possible scenario, at the end of aircraft take-off, compressed air from one engine (e.g. second engine 10B) may have been slowly bled off and fed to the external pressure vessel 80 such that this external pressure vessel 80 is fully "charged" with compressed air. The second engine 10B can then be shut down or placed in very low power standby mode, as described above, once the aircraft has reached its flight cruise phase, with the accumulated compressed air stored in the external pressure vessel 80. When/if needed for an emergency re-start or power recovery of the second engine 10B, the accumulated compressed air retained in the pressure vessel 80 is then fed back into the compressor of the shut-down engine 10B to enable a rapid re-start thereof.

With specific respect to the introduction of the compressed air from the pressure vessel 80 into the cold section of the engine operating in a standby mode, when required for the purposes of executing an emergency re-start and/or a rapid acceleration of the low power standby engine, this injection of the accumulated compressed air is optimally done somewhere between the inlet 22A, 22B of the engine in question and the combustor 16A, 16B thereof (i.e. somewhere within the cold section of the engine. The precise location that this accumulated compressed air is injected into the cold section may vary, and is selected depending on the particular engine architecture (e.g. number of compressor stages, compressor inertia, etc.) and the available compressed air (volume, pressure) as well as the desirable engine power recovery time. However, in one particular embodiment, the injection of the compressed air from the pressure vessel 80 into the standby engine, when it needs to be rapidly re-accelerated and/or started, may be done at or just upstream of the HP compressor 14A, 14B of the engine so as to rapidly spin-up the HP spool 28 (see FIGS. 2 and 3). In such an embodiment, therefore, the injection of the accumulated compressed air stored in the external pressure vessel 80 may be done at a point upstream of the HP compressor 14, 14A, 14B (e.g. impeller), which will cause the HP impeller 14, 14A, 14B to rotate as the accumulated compressed air flows therethrough. This may help to facilitate the re-start. In an alternate embodiment, however, the accumulated compressed air from the pressure vessel 80 can be injected into the standby engine at a location that is just downstream end of the HP compressor 14, 14A, 14B and immediately upstream of the combustor 16, 16A, 16B. Additionally, in one particular embodiment, the air accumulated in the pressure vessel 80 can also be injected or re-injected back into the standby engine via the same accumulator bleed ports 86A, 86B described above, which may have been used to extract the compressed air in the first place.

Regardless of the specific location at which the accumulated compressed air from the pressure vessel 80 is injected into the engine that needs to be rapidly re-started or accelerated to full power, an active control system 90 may be provided to control this re-injection of the external compressed air from the pressure vessel 80. The actively controlled reinjection system 90, which is in communication with the engine controller 29 (also referred to herein simply as FADEC 29) (see FIGS. 2-3) and is controlled thereby, may for example include at least one active valve (which may be, for example, one for each engine) and/or a pressure regulating valve which are collectively operable to control the injection of the compressed air. For example, the actively controlled reinjection system 90 may be configured to permit a more constant flow of the compressed air being injected back into the standby engine, and thus may avoid having too much compressed air injected back into the engine too early, thus avoiding all of the accumulated compressed air being used up and consequently ensuring that there is sufficient compressed air for use in a later phase of the start and re-acceleration sequence of the engine as it starts back up. The actively controlled reinjection system 90 may also include, or alternately form part of, the control valve or valves 84A, 84B and/or servo valves, all controlled via the FADEC, used for the extraction of the accumulated compressed air in the first place. Thus, in certain embodiments, a single flow control system (e.g. the system 90) that is itself controlled by the FADEC, may be used to control both compressed air extraction from one or both engines, and the injection of the accumulated compressed from the external pressure vessel 80 into the standby engine when required for a rapid re-acceleration thereof.

When the accumulated compressed air is introduced back into the shut-down engine for the purposes of emergency restart or acceleration, the regular starter of the engine in question may still be used to re-start the engine. However, in certain situations, the flight conditions (e.g. altitude, temperature, Mach number, etc. and the operating status of each of the engines (e.g. out of usage, shut-down, sub-idle, idle, low or high power) may permit the engine to be re-started without requiring the use of the regular starter.

Additionally, a suitable flow blocking system 88A, 88B may also be provided within each engine 10A, 10B to prevent the accumulated high pressure compressed air within the pressure vessel 80, when re-injected back into the shut-down engine, from flowing backwards through the engine (e.g. from the re-injection point within the cold section of the engine upstream through the main gas path of the engine core towards the air inlet of the engine, rather than downstream to the combustor). This may be achieved, for example, using one or more one-way valves or another backflow prevention system—e.g. valves or other devices to block the exits of HP compressor diffuser pipes, for example when the injection point is done past that component. Additionally, other engine components, such as variable guides vanes for instance, could also be used to block the compressor gas path when the compressor air is injected downstream that component and upstream to one or more compressor stage.

Solutions for improving operating fuel efficiencies of multi-engine systems, such as the present multi-engine system 42 as described herein, have been proposed in other disclosures. One such example is described in U.S. patent application Ser. No. 16/560,365 filed Sep. 4, 2019, the entire contents of which are incorporated herein, which describes a specific control logic for achieve fuel economy of a multi-engine system. In this document, a "breathing cycle" of an engine is described, wherein rotor inertia is used for energy accumulation and then re-used during a suitable point in the breathing cycle. It is of note that the compressed air accumulated in the external pressure vessel 80 of the present disclosure may be used in a similar manner, namely in order to extend the time of the "breathing phase" when fuel flow is low.

Figure 5:
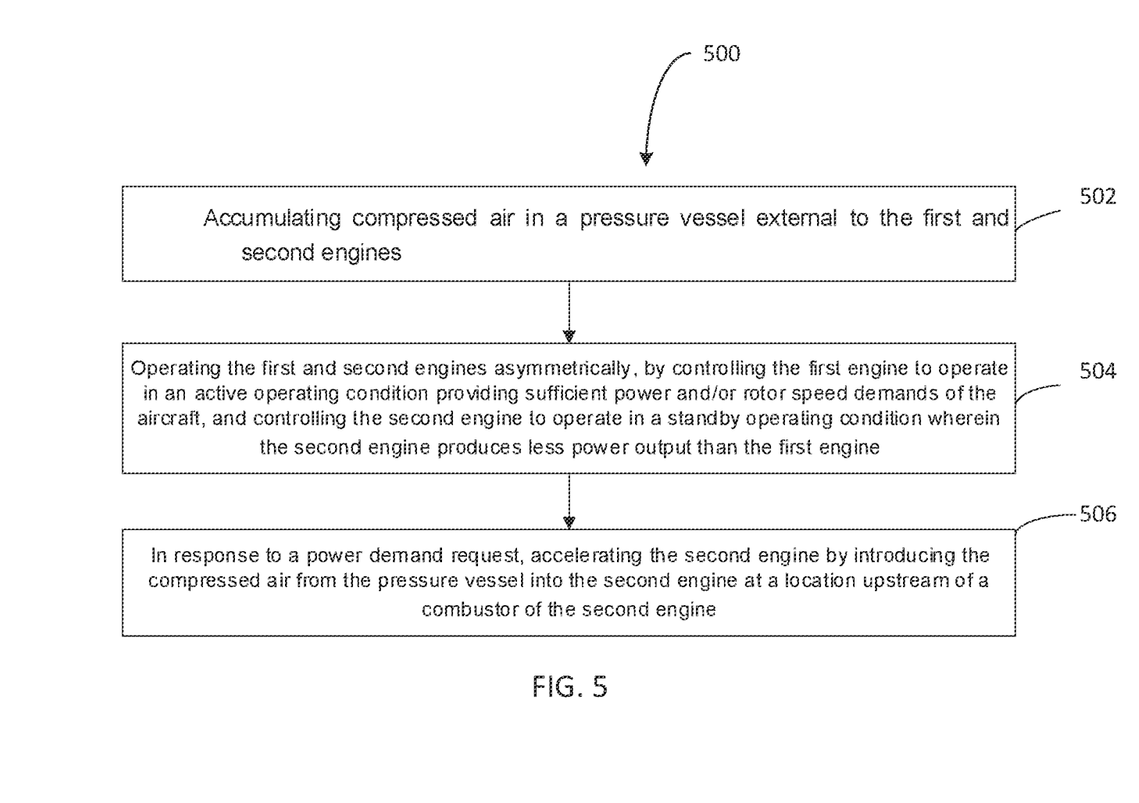
FIG. 5 is a flowchart showing a method of operating a multi-engine aircraft in accordance with the present disclosure.

Referring now to FIG. 5, a method of operating the multi-engine system 42 of an aircraft is shown at 500. In accordance with the present description, there is therefore provided a method 500 of operating a multi-engine system 42 of an aircraft 1, such as helicopter H, having a first engine 10A and a second engine 10B.

The method 500 includes: accumulating compressed air in a pressure vessel 80 that is external to the first and second engines 10A, 10B, at step 502; operating the first and second engines asymmetrically, by controlling the first engine 10A to operate in an active, or high power, operating condition wherein it provides sufficient power and/or rotor speed to meet the demands of the aircraft, and controlling the second engine 10B to operate in a standby operating condition wherein the second engine 10B produces less power output than the first engine 10A, at 504; and, in response to a power demand request, accelerating the second engine 10B by introducing the compressed air from the pressure vessel 80 into the second engine 10B at a location therein upstream of a combustor 16B of the second engine 10B, at 506. Because this location at which the compressed air is introduces is within the cold section of the engine, it is necessarily downstream of an air inlet 22B of the second engine.

Step 502 of the method 500 may include extracting bleed air from one or more of the first engine 10A and the second engine 10B, and feeding the bleed air into the pressure vessel 80. Additionally, extracting the bleed air may include extracting the bleed air from one or more of a high pressure compressor 14A of the first engine 10A and a high pressure compressor 14B of the second engine 10B. Extracting the bleed air may also include extracting the bleed air from the second engine 10B prior to the second engine being controlled to produce less power output than the first engine 10A.

Step 502 may also include gradually extracting the bleed air from both the one or more of the first and second engines from a beginning of a flight mission, after the one or more of first and second engines is started or after the aircraft has taken-off. Additionally, accumulating the compressed air may include using one or more valves, such as servo control valves operated by the engine controller or FADEC 29, to control the extracting of the bleed air. Accumulating the compressed air may also include extracting additional bleed air from the first engine 10A, after the second engine 10B has been controlled to produce less power output than the first engine.

At step 506 of the method 500, introducing the compressed air from the pressure vessel 80 may include injecting the compressed air into the second engine 10B upstream of the high pressure compressor 14B of the second engine 10B, such as to rapidly spin (e.g. to "spin-up") a high pressure spool 28 of the second engine 10B (the high pressure spool 28 including the high pressure compressor 14B mounted thereon).

At step 502, both extracting the bleed air to accumulate the compressed air in the pressure vessel and introducing the compressed air into the second engine may be carried out via one or more common ports in the second engine 10B, such as the port 86B for example.

Step 504 may include operating the second engine 10B to provide minimal or no propulsive power to the aircraft.

Step 506 may include accelerating the second engine 10B from the standby operating condition to an active operating condition corresponding to that of the first engine.

Operating the first and second engines 10A, 10B asymmetrically, as in step 504, may be performed during a cruise flight segment of the aircraft.

At step 506, prior to the introducing of the compressed air from the pressure vessel 80 into the second engine 10B at said location upstream of the combustor 16B, there may also include blocking a main gas path of the second engine 10B upstream of said location to prevent back-flow of the compressed air through the main gas path of the second engine.

The method 500 may be used for example to operate the multi-engine system 42 during, in one example, a cruise flight segment which may be described as a continuous, steady-state flight segment which is typically at a relatively constant cruising speed and altitude. In a typical cruise mode for twin-engine helicopters, both engines provide ~50% of the cruise power demand of the helicopter. This power level of each engine (~50% of total power required by the helicopter) may be referred to herein as a "cruise power level".

Step 504 of the method 500 can include using the engine controller 29, such as a full authority digital control (FADEC) 29 to control the engines 10A, 10B to operate asymmetrically. The FADEC 29 may thus determine that the aircraft is in a suitable condition for entering asymmetric mode, for example during a cruise flight segment. The FADEC 29 may accelerate one engine (say 10A) of the multiengine system 42 from a cruise power level into an active engine mode, in which the first engine may provide a higher cruise power level and sufficient power to satisfy substantially all or all (e.g. 90% or higher) of a helicopter power or rotor speed demand. The FADEC 29 may then decelerate another engine (say 10B) of the multi-engine system 42 to operate in a standby mode (as described herein) at a power substantially lower than cruise power level, and in some embodiments at zero output power (i.e. the standby engine is completely shut down) and in other embodiments less than 10% output power relative to a reference power (provided at a reference fuel flow).

Figure 6:
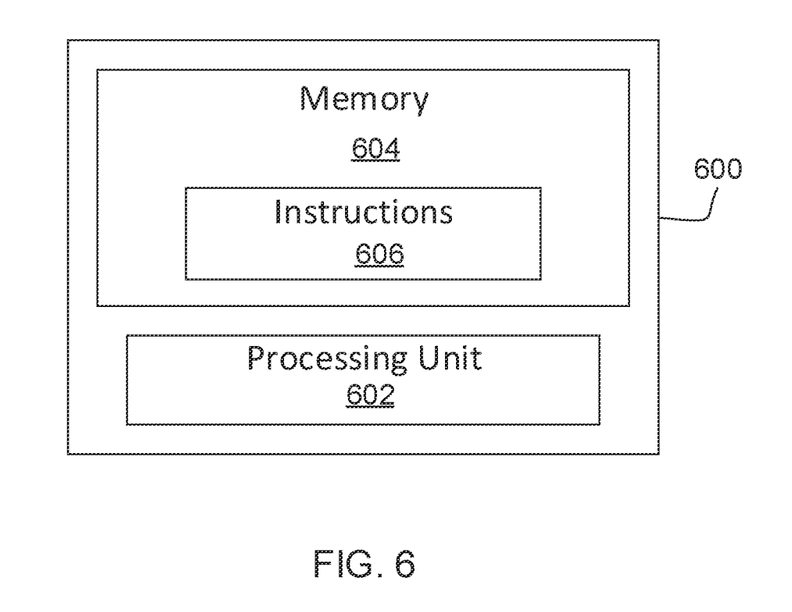
FIG. 6 is a schematic representation of a computing device of the system and method of the present disclosure.

With reference to FIG. 6, an example of a computing device 600 is illustrated. For simplicity only one computing device 600 is shown but the system may include more computing devices 600 operable to exchange data. The computing devices 600 may be the same or different types of devices. The controller 29 may be implemented with one or more computing devices 600. Note that the controller 29 can be implemented as part of a full-authority digital engine controls (FADEC) or other similar device, including electronic engine control (EEC), engine control unit (ECU), electronic propeller control, propeller control unit, and the like. In some embodiments, the controller 29 is implemented as a Flight Data Acquisition Storage and Transmission system, such as a FAST™ system. The controller 29 may be implemented in part in the FAST™ system and in part in the EEC. Other embodiments may also apply.

The computing device 600 comprises a processing unit 602 and a memory 604 which has stored therein computer-executable instructions 606, which serve to control the engine system in the manner described herein. More particularly, the processing unit 602 may comprise any suitable devices configured to implement the method 500 such that instructions 606, when executed by the computing device 600 or other programmable apparatus, may cause the functions/acts/steps performed as part of the method 500 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for operating the multi-engine system described herein may be implemented in a high level procedural or object oriented programming or scripting language, or a combination thereof, to communicate with or assist in the operation of a computer system, for example the computing device 600. Alternatively, the methods and systems for operating the multi-engine system may be implemented in assembly or machine language. The language may be a compiled or interpreted language. Program code for implementing the methods and systems for operating the multi-engine system may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating the multi-engine system may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

Thus, the above description is meant to be exemplary only, and one skilled in the art will recognize that changes may be made to the embodiments described without departing from the scope of the invention disclosed. For example, the multi-engine system may have more than two engines, in which case any suitable number of the engines may operate in the active and standby modes, respectively. Additionally, although turboshaft engines have been generally described, the engines of the multi-engine system can alternately be other types of gas turbine engines, and they can also be other types of suitable aircraft engines, including for example engines which include electrical components for motive power—provided of course that these engines can benefit from compressed air injection therein for the purposes of accelerating a standby engine back up to a motive power, in the manner described hereinabove. Further still, the engines of the multi-engine system need not all be of the same type, wherein for example one or more of the engines is a gas turbine engine and the other is a fully electric or hybrid engine, for example. It also to be understood that a single engine system, such as shown in FIG. 3, may also be operated in a low power regime, without the context of a multi-engine system, and thus the systems and methods described herein may also be used in the context of a single engine. For example, a very low speed "sub-idle" or "standby" operation of a single-engine system may also be desirable in some circumstances, such as on the ground. While the present specification describes the multi-engine system used in a rotorcraft, such as helicopter H, it can applied to other types of multi-engine aircraft or power systems, such as marine and industrial power systems. The engine controller may be any suitable, and the methods of effecting engine control also do not form any part of this description other than as expressly provided. Still other modifications which fall within the scope of the present invention will be apparent to those skilled in the art, in light of a review of this disclosure.

The invention claimed is:

1. A method of operating a multi-engine system of an aircraft having a first engine and a second engine, the method comprising:

accumulating compressed air in a pressure vessel external to the first and second engines;

when the aircraft is in flight at an altitude above the ground, operating the first and second engines asymmetrically, by controlling the first engine to operate in an active operating condition providing sufficient power and/or rotor speed for demands of the aircraft, and controlling the second engine to operate in a standby operating condition wherein the second engine produces less power output than the first engine; and in response to a power demand request, and when the aircraft is in flight at an altitude above the ground, accelerating the second engine by: introducing the compressed air from the pressure vessel into the second engine at a location upstream of a combustor of the second engine; and, prior to the introducing of the compressed air from the pressure vessel into the second engine at said location upstream of the combustor, blocking a main gas path of the second engine upstream of said location to prevent back-flow of the compressed air through the main gas path.

2. The method of claim 1, wherein the accumulating includes extracting bleed air from one or more of the first engine and the second engine, and feeding the bleed air into the pressure vessel.

3. The method of claim 2, wherein the extracting the bleed air includes extracting the bleed air from one or more of a high pressure compressor of the first engine and a high pressure compressor of the second engine.

4. The method of claim 2, wherein the extracting includes extracting the bleed air from the second engine prior to the second engine being controlled to produce less power output than the first engine.

5. The method of claim 2, wherein the accumulating includes gradually extracting the bleed air from the one or more of the first and second engines from a beginning of a flight mission, after the one or more of the first and second engines is started or after the aircraft has taken-off.

6. The method of claim 2, wherein the accumulating includes using one or more valves to control the extracting of the bleed air.

7. The method of claim 1, wherein the introducing the compressed air from the pressure vessel includes injecting the compressed air into the second engine upstream of a high pressure compressor of the second engine, to rapidly spin a high pressure spool of the second engine having the high pressure compressor.

8. The method of claim 1, wherein the controlling the second engine to operate in the standby operating condition includes operating the second engine to provide minimal or no propulsive power to the aircraft.

9. The method of claim 1, wherein the second engine is shut down in the standby operating condition, and the accelerating the second engine includes accelerating the second engine from shut down to an active operating condition corresponding to that of the first engine.

10. The method of claim 1, wherein operating the second engine in the standby operating condition comprises, in flight, operating the second engine to produce substantially no motive power to the aircraft.

11. A method of operating a multi-engine system of an aircraft having a first engine and a second engine, the method comprising:

accumulating compressed air in a pressure vessel external to the first and second engines, including extracting additional bleed air from the first engine after the second engine has been controlled to produce less power output than the first engine;

when the aircraft is in flight at an altitude above the ground, operating the first and second engines asymmetrically, by controlling the first engine to operate in an active operating condition providing sufficient power and/or rotor speed for demands of the aircraft, and controlling the second engine to operate in a standby operating condition wherein the second engine produces less power output than the first engine; and in response to a power demand request, and when the aircraft is in flight at an altitude above the ground, accelerating the second engine by: introducing the compressed air from the pressure vessel into the second engine at a location upstream of a combustor of the second engine.

12. A method of operating a multi-engine system of an aircraft having a first engine and a second engine, the method comprising:

accumulating compressed air in a pressure vessel external to the first and second engines, including extracting bleed air from one or more of the first engine and the second engine and feeding the bleed air into the pressure vessel, wherein both the extracting bleed air to accumulate the compressed air in the pressure vessel and the introducing the compressed air into the second engine is carried out via one or more common ports in the second engine;

when the aircraft is in flight at an altitude above the ground, operating the first and second engines asymmetrically, by controlling the first engine to operate in an active operating condition providing sufficient power and/or rotor speed for demands of the aircraft, and controlling the second engine to operate in a standby operating condition wherein the second engine produces less power output than the first engine; and in response to a power demand request, and when the aircraft is in flight at an altitude above the ground, accelerating the second engine by: introducing the compressed air from the pressure vessel into the second engine at a location upstream of a combustor of the second engine.

13. A multi-engine system for an aircraft comprising:

a first engine and a second engine driving a common gearbox configured to drive a load, the first engine and the second engine respectively including a first compressor and a second compressor;

a pressure vessel external to the first engine and the second engine, the pressure vessel in fluid flow communication with one or both of the first and second compressors via: an accumulation flow path along which compressed air produced by one or both of the first and second compressors flows to reach the pressure vessel; and an injection flow path along which compressed air accumulated within the pressure vessel flows to reach an injection port in at least the second engine;

a valve in fluid communication with the accumulation flow path and the injection flow path, the valve being operable to move between a closed position and an open position, wherein in the open position the compressed air is permitted to flow either along the accumulation flow path or along the injection flow path;

a flow blocking system disposed in at least the second engine upstream of the injection port, the flow blocking system being configured to block a main gas path upstream of the injection port to prevent back-flow of the compressed air through the main gas path when the compressed air flows through the injection point into the second engine; and an engine controller configured to control the first engine to operate in an active operating condition and to control the second engine to operate in a standby operating condition, wherein in the active operating condition the first engine provides sufficient power and/or rotor speed for demands for the aircraft, and in the standby operating condition the second engine provides provide minimal or no propulsive power to the aircraft, wherein the engine controller is in communication with the valve to control operation thereof, the engine controller operable to position the valve at one or more intermediate positions between the closed position and the open position, to control injection and extraction of compressed air through the accumulation flow path and the injection flow path.

14. The multi-engine system of claim 13, wherein the pressure vessel is one of two or more pressure vessels, each of the two or more pressure vessels being in fluid flow communication with a respective one of the first and second engines.

15. The multi-engine system of claim 13, wherein the pressure vessel is inflatable.

16. The multi-engine system of claim 13, wherein the pressure vessel is thermally insulated, to retain heat of the compressed air accumulated within the pressure vessel.

17. The multi-engine system of claim 13, wherein the pressure vessel is cooled to increase a storage capacity thereof.

* * * * *